United States Patent
Watanabe et al.

(10) Patent No.: US 7,058,740 B2
(45) Date of Patent: Jun. 6, 2006

(54) EFFECTIVE BUS UTILIZATION USING MULTIPLE BUSES AND MULTIPLE BUS CONTROLLERS

(75) Inventors: Hidekazu Watanabe, San Diego, CA (US); Wang Sheng Hang, San Diego, CA (US); Simon Kim, Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 945 days.

(21) Appl. No.: 09/802,356

(22) Filed: Mar. 8, 2001

(65) Prior Publication Data

US 2002/0126660 A1    Sep. 12, 2002

(51) Int. Cl.
*G06F 13/00* (2006.01)
*G06F 11/00* (2006.01)

(52) U.S. Cl. ............ 710/110; 714/11; 714/12; 714/13

(58) Field of Classification Search ......... 710/110; 714/11, 12, 13
See application file for complete search history.

(56) References Cited

U.S. PATENT DOCUMENTS 4,698,753 A * 10/1987 Hubbins et al. ......... 709/209
5,453,737 A * 9/1995 Opoczynski ............ 340/2.8
5,590,369 A * 12/1996 Burgess et al. ......... 710/110
5,598,542 A * 1/1997 Leung .................... 710/117
5,717,895 A * 2/1998 Leedom et al. ......... 711/140
6,233,635 B1 * 5/2001 Son ....................... 710/315
6,275,890 B1 * 8/2001 Lee et al. ............... 710/317
2002/0010822 A1 * 1/2002 Kim ....................... 710/110

OTHER PUBLICATIONS

Microsoft Press Computer Dictionary—Second Edition—1994—pp. 58 and 265.*

* cited by examiner

*Primary Examiner*—Khanh Dang
*Assistant Examiner*—Jeremy S. Cerullo
(74) *Attorney, Agent, or Firm*—Blakely, Sokoloff, Taylor & Zafman LLP.

(57) ABSTRACT

In one embodiment of the present invention, a bus controller is used in a multi-master system having first and second processors. The bus controller includes a bus arbiter and a first multiplexer. The bus arbiter is coupled to the first and second processors via first and second master buses, respectively, to generate an arbitration select signal based on result of arbitrating bus access information from the first and second processors. The first multiplexer is coupled to the first and second master buses and a first slave bus in a plurality of slave buses to provide device access information selected from the bus access information using the arbitration select signal. The device access information is transferred to a first slave device connected to the first slave bus.

27 Claims, 5 Drawing Sheets

EFFECTIVE BUS UTILIZATION USING MULTIPLE BUSES AND MULTIPLE BUS CONTROLLERS

BACKGROUND

1. Field of the Invention

This invention relates to computer architecture. In particular, the invention relates to multi-master systems.

2. Description of Related Art

In a typical microprocessor system, a common bus is used to interface to the central processing unit (CPU), program memory, data memory, peripheral devices, direct memory access (DMA) controller, and other bus masters or slaves. In this traditional single bus system, only one master can use the bus at a time.

One technique to improve bus utilization is cycle stealing. Cycle stealing allows a master to steals some cycles from another master that is controlling the bus. This technique avoids bus monopoly by a master. However, the technique is limited to the maximum bandwidth of a single bus and requires extra circuit to provide cycle stealing operations.

Therefore, there is a need to have a technique to provide efficient bus accesses in a multi-master system.

SUMMARY

The present invention is a method and apparatus to provide efficient bus accesses in a multi-master system. In one embodiment of the present invention, a bus controller is used in a multi-master system having first and second processors. The bus controller includes a bus arbiter and a first multiplexer. The bus arbiter is coupled to the first and second processors via first and second master buses, respectively, to generate an arbitration select signal based on result of arbitrating bus access information from the first and second processors. The first multiplexer is coupled to the first and second master buses and a first slave bus in a plurality of slave buses to provide device access information selected from the bus access information using the arbitration select signal. The device access information is transferred to a first slave device connected to the first slave bus.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
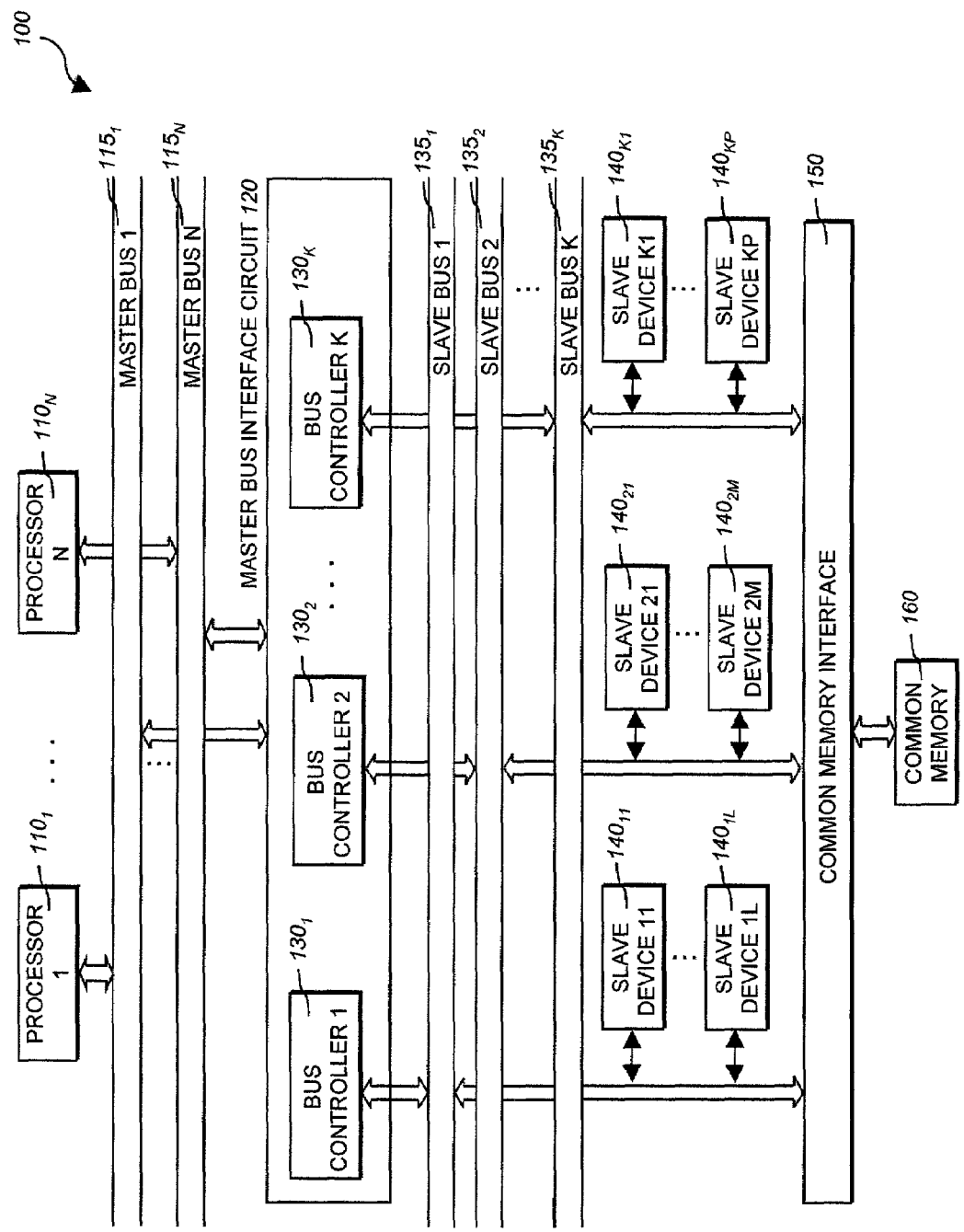
FIG. 1 is a diagram illustrating a system in which one embodiment of the invention can be practiced.

FIG. 1 is a diagram illustrating a system 100 in which one embodiment of the invention can be practiced. The system 100 includes N processors $110_1$ to $110_N$, N master buses $115_1$ to $115_N$, a master bus interface circuit 120, K slave buses $135_1$ to $135_K$, slave devices $140_{jk}$ (j=1, ..., K, k=1, ..., L, 1, ..., M, 1, ..., P), a common memory interface 150, and a common memory 160.

Each of the N processors $110_1$ to $110_N$ is coupled to each of the N master buses $115_1$ to $115_N$, respectively. The processors $110_1$ to $101_N$ are any processors that are capable of controlling their corresponding buses master buses $115_1$ to $115_N$. The ability to control the bus includes asserting mastership, issuing access control signals (e.g., read and write), issuing address and data, etc. A processor that can have control of a bus is referred to as a master. A device that can only receive information on the bus is referred to as a slave. Examples of the processors $110_1$ to $110_N$ include microprocessor, digital signal processor, micro-controller, direct memory access (DMA) controller, etc. Examples of a slave include memory devices, peripheral devices (e.g., serial communication, parallel input/output devices). The N master buses $115_1$ to $115_N$ may be homogeneous or heterogeneous. Examples of include the Peripheral Interconnect Component (PCI) bus, the Industry Standard Adapter (ISA), or any specially designed bus.

The master bus interface circuit 120 provides interface between the N master buses $115_1$ to $115_N$ and the K slave buses $135_1$ to $135_K$. The master bus interface circuit 120 includes K bus controllers $130_1$ to $130_K$. Each of the K bus controllers $130_1$ to $130_K$ is connected to the N processors $110_1$ to $110_N$ via the N master buses $115_1$ to $115_N$, respectively, and each of the corresponding K slave buses $135_1$ to $135_K$. By having an individual bus controller for each of the K slave buses $135_1$ to $135_K$, the master bus interface circuit 120 allows any of the N processors $110_1$ to $110_N$ to access any of the K slave buses $135_1$ to $135_K$.

The K slave buses $135_1$ to $135_K$ provide access to slave devices. Each of the K slave buses $135_1$ to $135_K$ is connected to a number of slave devices $140_{jk}$ (j=1, ..., K, k=1, ..., L, 1, ..., M, 1, ..., P). The L slave devices $140_{11}$ to $140_{1L}$ are connected to the slave bus $135_1$, ..., the M slave devices $140_{21}$ to $140_{2M}$ are connected to the slave bus $135_2$, ..., the P slave devices $140_{K1}$ to $140_{KP}$ are connected to the slave bus $135_K$. The K slave buses $135_1$ to $135_K$ may be homogeneous or heterogeneous, i.e., there may be a set of slave buses of the same type and other sets of slave buses of different types, or all the slave buses are of the same type. The slave devices may be any type of device that cannot or does not have control of the master buses. Examples of these slave devices $140_{jk}$ (j=1, ..., K, k=1, ..., L, 1, ..., M, 1, ..., P) include slave processors, micro-controllers, memory devices, peripheral input/output (I/O) devices, network interface, printer controller, disk drive controller, media interface (e.g., graphics, audio, video), etc. Memory devices include random access memory (RAM), read only memory (ROM), flash memory, or even mass storage device such as compact disk (CD) ROM, floppy diskette, and hard drive.

The common memory interface 150 is connected to the K slave buses $135_1$ to $135_K$ and the common memory 160 to allow any of the N processors $110_1$ to $110_N$, or even any of the slave devices $140_{jk}$ (j=1, ..., K, k=1, ..., L, 1, ..., M, 1, . . . , P) to access the common memory 160. The common memory 160 is a memory that is common to all the N processors 110₁ to 110_N. In other words, any of the N processors 110₁ to 110_N can access the common memory 160 via an appropriate data path. Typically, the common memory 160 stores information that is relevant to most or all processors and slave devices. The common memory 160 may contain data, records, structures, linked lists, configuration data, status information, messages, mails, etc. The common memory 160 may also contain program segments, routines, functions, library of functions, etc., that can be used by any of the N processors 110₁ to 110_N. The common memory 160, therefore, may be program memory, data memory, or a combination of both.

Figure 2A:
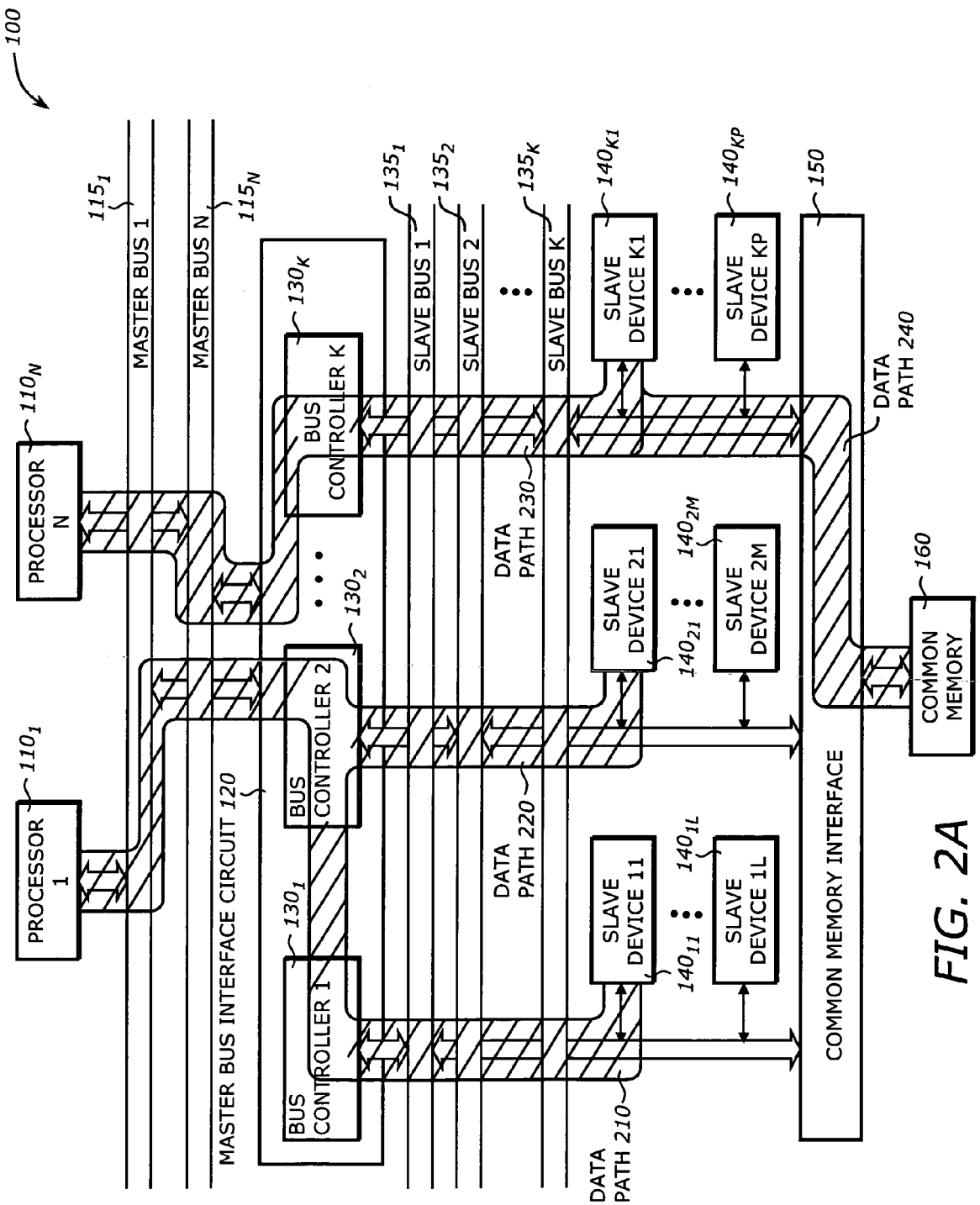
FIG. 2A is a diagram illustrating data flows for multiple accesses for the system shown in FIG. 1 according to one embodiment of the invention.

FIG. 2A is a diagram illustrating data flows for multiple accesses for the system shown in FIG. 1 according to one embodiment of the invention.

In this illustrative example, processor 110₁ is a DMA controller that transfers a block of data from one device to another device (e.g., data memories), and processor 110_N is a microprocessor that accesses a program memory and a common data memory.

The processor 110₁ follows two data paths 210 and 220. The processor 110₁ performs a DMA from the slave device 140₁₁ to the slave device 140₂₁. The processor 110₁ provides access information (e.g., read address) to the slave device 140₁₁ via the data path 210 going through the master bus 115₁, the bus controller 130₁ in the master bus interface circuit 120, the slave bus 135₁, and then to the slave device 140₁₁. The processor reads a block of data from the slave device 140₁₁, then provides access information (e.g., address and write data) to the slave device 140₂₁ via the data path 220 going through the master bus 115₁, the bus controller 130₂, the slave bus 135₂, and then to the slave device 140₂₁.

The processor 110_N follows a data path 230. For example, the processor 110_N is a microprocessor fetching instructions from a program memory stored in slave device 140_K₁. The data path 230 goes through the master bus 115_N, the bus controller 130_N, the slave bus 135_K, to the slave device 140_K₁. The processor 110_N may also follow data path 240 to go through the common memory interface 150 and to the common memory 160.

It is noted that the two processors 110₁ and 110_N can perform their respective function simultaneously. The two processors follow separate and independent data paths and therefore there is no bus conflict or contention. In this illustrative example, the DMA controller 110₁ can perform DMA transfers efficiently while the microprocessor 110_N continues program execution. It is also noted that use of two processors is for illustrative purposes only. Any number of processors can have concurrent accesses to their respective slave devices.

Figure 2B:
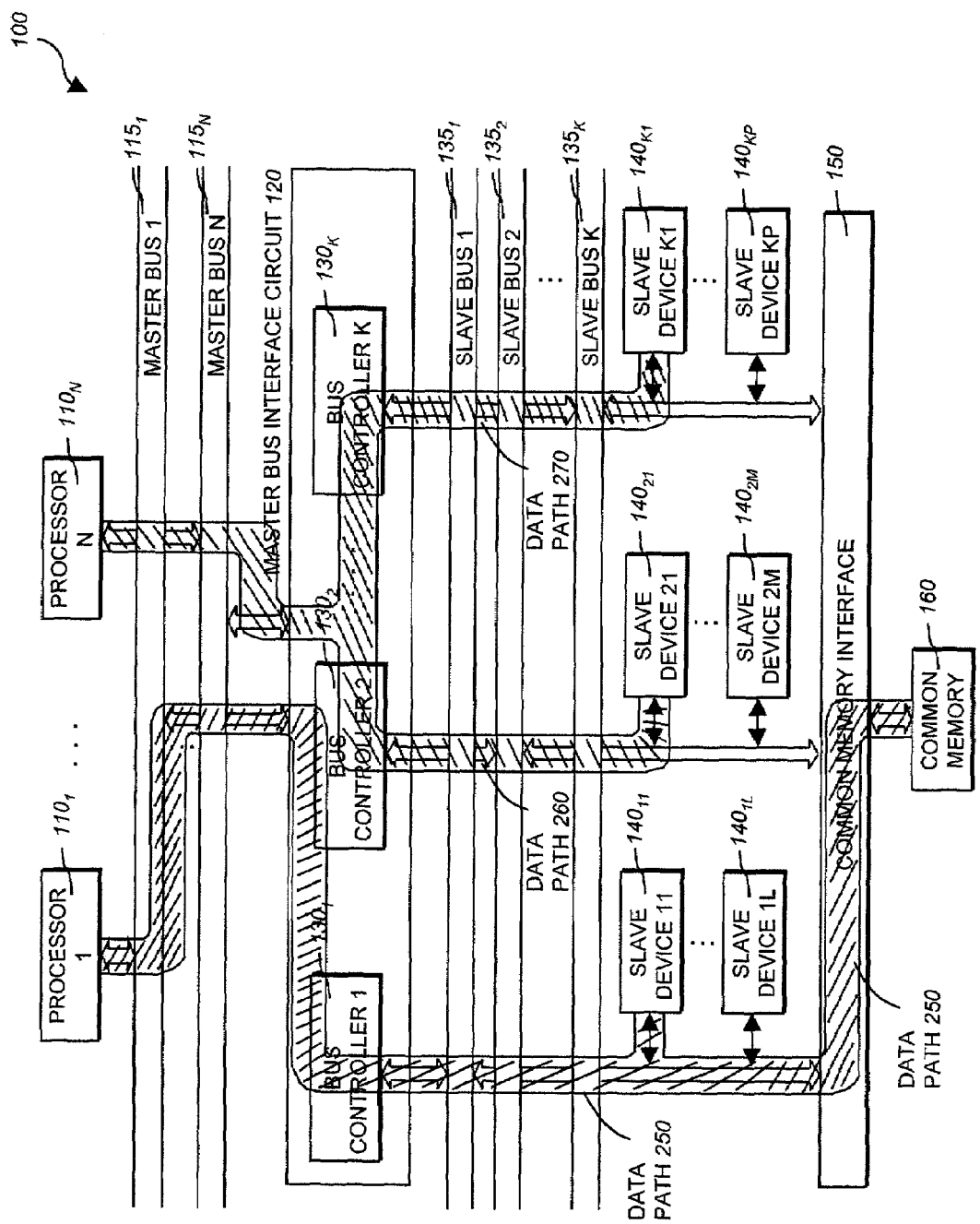
FIG. 2B is a diagram illustrating data flows for multiple accesses for the system shown in FIG. 1 according to one embodiment of the invention.

FIG. 2B is a diagram illustrating data flows for multiple accesses for the system shown in FIG. 1 according to one embodiment of the invention.

In this illustrative example, processor 110₁ is a DMA controller that transfers a block of data from one device to the common memory, and processor 110_N is a microprocessor that writes data to two peripheral devices.

The processor 110₁ follows two data paths 240 and 250. The processor 110_N performs a DMA from the slave device 140₁₁ to the common memory 160. The processor 110₁ provides access information (e.g., read address) to the slave device 140₁₁ via the data path 240 going through the master bus 115₁, the bus controller 130₁, in the master bus interface circuit 120, the slave bus 135₁, and then to the slave device 140₁₁. The processor reads a block of data from the slave device 140₁₁, then provides access information (e.g., address and write data) to the common memory 160 via the path 250 going through the master bus 115₁, the bus controller 130₁, the slave bus 135₁, the common memory interface 150, and then to the common memory 160.

The processor 110_N follows two data paths 260 and 270. For example, the processor 110_N is a microprocessor writing data to both slave devices 140₂₁ and 140_K₁. The data path 260 goes through the master bus 115_N, the bus controller 135₂, the slave bus 135₂, to the slave device 140₂₁. The data path 270 goes through the master bus 115_N, the bus controller 135_N, the slave bus 135_K, to the slave device 140_K₁.

As in the illustrative example shown in FIG. 2B, the two processors 110₁ and 110_N can perform their respective function simultaneously. The two processors follow separate and independent data paths and therefore there is no bus conflict or contention. Again, any number of processors can access their respective slave devices via the bus controller 120.

Figure 3:
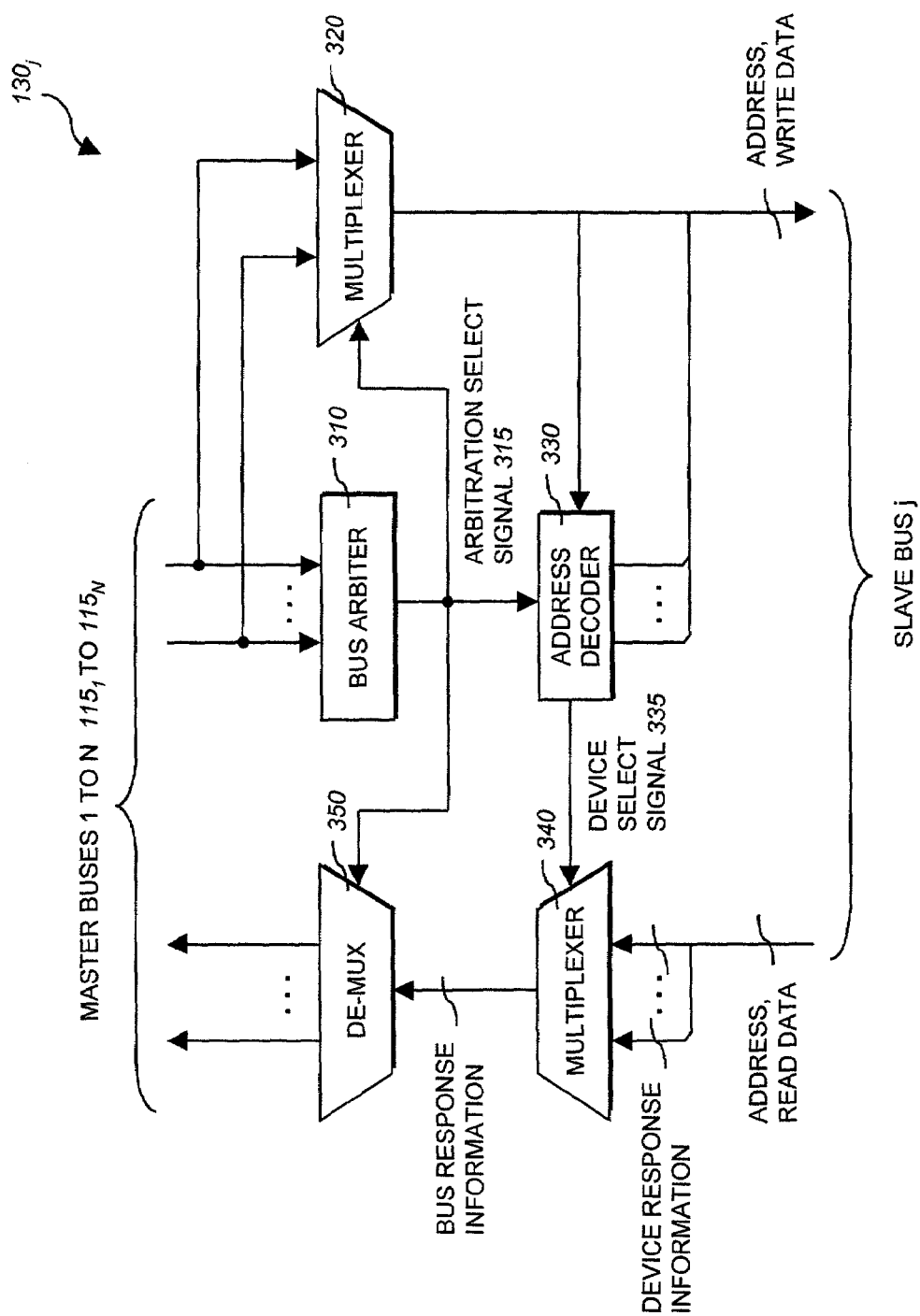
FIG. 3 is a diagram illustrating a bus controller shown in FIG. 1 according to one embodiment of the invention.

FIG. 3 is a diagram illustrating a bus controller 130j shown in FIG. 1 according to one embodiment of the invention. The bus controller 130j includes a bus arbiter 310, a write multiplexer 320, an address decoder 330, a read multiplexer 340, and a de-multiplexer 350.

The bus arbiter 310 is connected to the N processors 110₁ to 110_N via the N master buses 115₁ to 115_N. The bus arbiter 310 generates an arbitration select signal 315 based on result of arbitrating bus access information from the N processors 110₁ to 110_N. The arbitration may be based on some pre-defined prioritization scheme. The prioritization may be fixed or static or variable or dynamic. In a static prioritization, each processor is assigned a fixed priority level. When two or more processors access the same slave bus, the processor having higher priority level will be given control. In a dynamic prioritization, the priority level is variable and may be based on some dynamic algorithm. For example, each priority level may be adjusted up or down depending on how frequently the corresponding processor has been allowed to have access to the bus. The arbitration select signal 315 essentially encodes the processor select information, which can be used to select the corresponding processor that is given access.

The write multiplexer 320 is used to transfer the device access information from the selected processor to the destination slave device. The N inputs of the write multiplexer 320 are connected to the N master buses 115₁ to 115_N. The output of the write multiplexer is connected to one of the slave buses 135₁ to 135_K. Each of the bus controllers 130₁, to 130_K is assigned to each of the slave buses 135₁ and 135_K. The arbitration select signal 315 selects the bus access information from the processor that wins in the arbitration. The selected device access information is then transferred to the corresponding slave bus and directed to the destination slave device connected to that slave bus. The device access information includes information relating to the device access such as the device request, the slave address and the data to be written to the slave device.

The address decoder 330 is connected to the bus arbiter 310 and the write multiplexer 320 to decode the slave address as provided by the device access information from the write multiplexer 320. The decoded slave address specifies the destination slave device. The address decoder 330 generates a number of device select signals, one of which is active to correspond to the destination slave device. The address decoder 330 also generates a device select signal 335 based on the specified slave address. The device select signal 335 is used to select device response information from the read multiplexer 340.

The read multiplexer 340 is connected to the designated slave bus to provide bus response information from the device response information using the device select signal 335. The device response information includes a device ready signal and the read data provided by the specified slave device.

The de-multiplexer 350 is connected to the read multiplexer 340 and the N processors $110_1$ to $110_N$ to transfer the bus response information from the read multiplexer 340 to the processor that wins the arbitration as provided by the arbitration select signal 315 from the arbiter 310. The de-multiplexer 350 may be implemented by tri-state bus drivers connected to the N master buses $115_1$ to $115_N$, and a decoder. The decoder decodes the arbitration select signal 315 into N enable signals one of which is active. The active enable signal corresponds to the processor that wins the arbitration.

The bus controller 130j therefore provides bi-directional access between the N master buses $115_1$ to $115_N$ and the slave bus $135_j$. In addition, the bus controller $130_j$ allows any one of the slave devices connected to the slave bus $135_j$ to be accessed. Since there are K bus controllers in the master bus interface circuit 120 corresponding to K slave buses $135_1$ to $135_K$, respectively, concurrent or parallel accesses between any of the processors $110_1$ to $110_N$ to any of the slave devices is possible.

Figure 4:
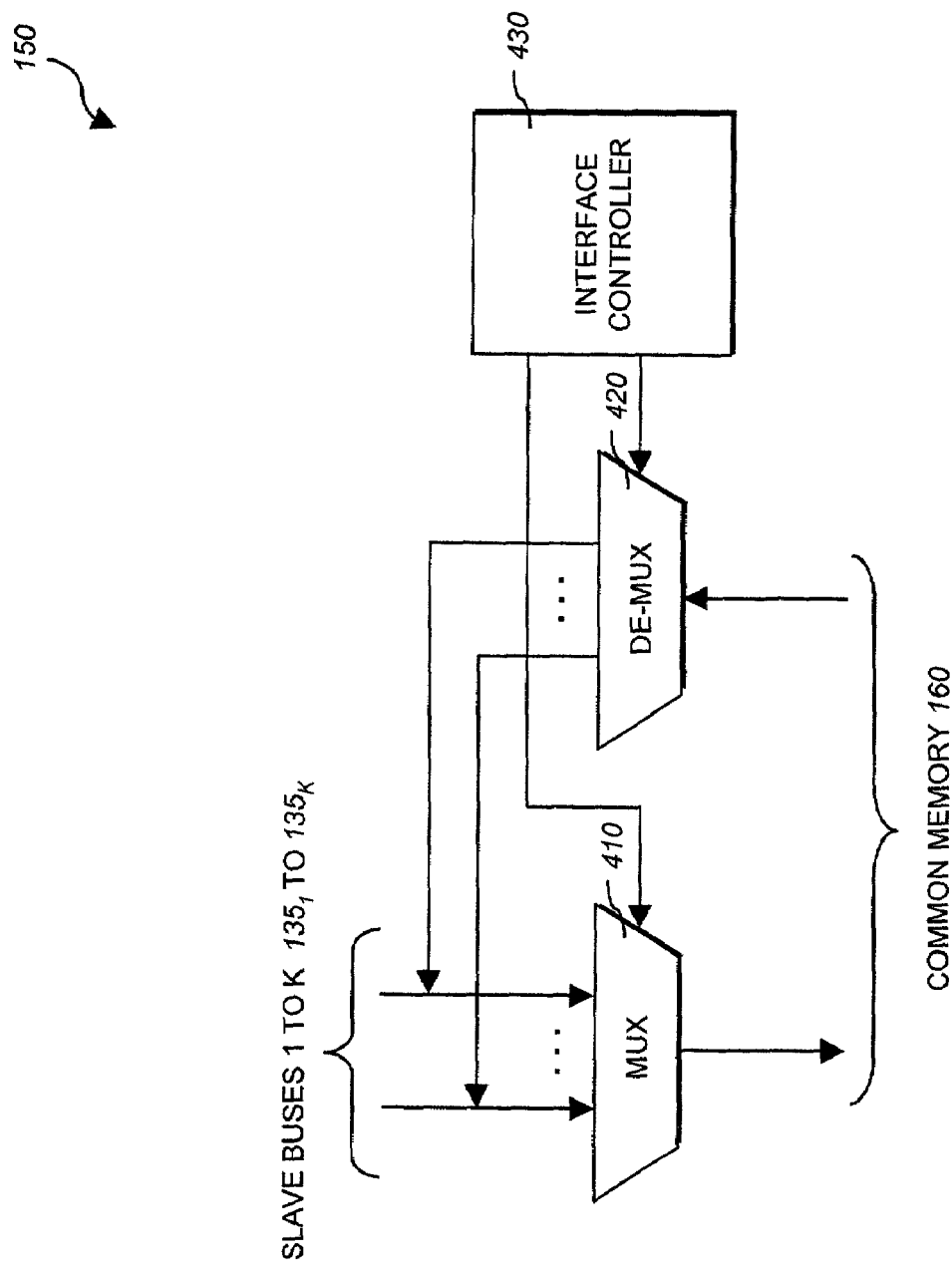
FIG. 4 is a diagram illustrating a common memory interface shown in FIG. 1 according to one embodiment of the invention.

FIG. 4 is a diagram illustrating the common memory interface 150 shown in FIG. 1 according to one embodiment of the invention. The common memory interface 150 includes a multiplexer 410, a de-multiplexer 420, and an interface controller 430.

The multiplexer 410 has K inputs connected to K slave buses $135_1$ to $135_K$. The output of the multiplexer 410 is connected to the common memory 160. The multiplexer 410 transfers the common memory access information to the common memory 160 using a select signal provided by the interface controller 430. The common memory access information includes memory select signals and data to be written into the common memory 160.

The de-multiplexer 420 routes the memory access information to the proper slave bus based on another select signal provided by the interface controller 430. The de-multiplexer 420 may be implemented by K tri-state bus drivers and a decoder which is used to enable one of the K tri-state bus drivers. The K tri-state bus drivers are connected to the K slave buses $135_1$ to $135_K$. The memory access information includes the read data provided by the common memory 160 to the selected slave bus.

The interface controller 430 includes circuit to generate select signals based on the control signals from the N processors $110_1$ to $110_N$ or based on one designated supervisor processor within the N processors $110_1$ to $110_N$.

By coupling to K slave buses $135_1$ to $135_K$, the common memory interface 150 allows any of the N processors $110_1$ to $110_N$ or any of the slave devices $140_{jk}$ to have access to the common memory 160.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a bus arbiter coupled to first and second processors via first and second master buses, respectively, to generate an arbitration select signal based on result of arbitrating bus access information from the first and second processors;
    a first multiplexer coupled to the first and second master buses and a first slave bus in a plurality of slave buses to provide device access information selected from the bus access information using the arbitration select signal, the device access information being transferred to a first slave device connected to the first slave bus;
    a second multiplexer coupled to the first slave bus to provide bus response information from device response information using the device select signal; and
    a de-multiplexer coupled to the second multiplexer and the first and second master buses to transfer the bus response information to one of the first and second processors using the arbitration select signal.

2. The apparatus of claim 1 wherein the device access information includes at least one of slave address and write data.

3. The apparatus of claim 2 further comprising:
    an address decoder coupled to the bus arbiter and the first multiplexer to decode the slave address, the decoded slave address specifying the first slave device, the address decoder generating device select signal.

4. The apparatus of claim 1 wherein the device response information includes at least one of device ready status and read data.

5. The apparatus of claim 4 wherein the plurality or slave buses are coupled to a common memory via a common memory interface.

6. The apparatus of claim 4 wherein one of the first and second processors is a direct memory access (DMA) controller.

7. The apparatus of claim 4 wherein one of the first and second processors is a microprocessor.

8. The apparatus of claim 4 wherein the first slave device is one of a memory device and a peripheral device.

9. The apparatus of claim 4 wherein the plurality or slave buses includes at least one of a homogenous set and a heterogeneous set.

10. A method comprising:
    generating an arbitration select signal based on result of arbitrating bus access information from first and second processors via first and second master buses, respectively;
    providing device access information selected from the bus access information using a first multiplexer and the arbitration select signal, the device access information being transferred to a first slave device connected to a first slave bus from a plurality of slave buses;
    providing bus response information from device response information using a second multiplexer and the device select signal; and
    transferring the bus response information to one of the first and second processors using a de-multiplexer and the arbitration select signal.

11. The method of claim 10 wherein providing device access information comprises providing at least one of slave address and write data.

12. The method of claim 11 further comprising:
    decoding the slave address, the decoded slave address specifying the first slave device; and
    generating device select signal.

13. The method of claim 10 wherein providing the bus response information from device response information comprises providing the bus response information from at least one of device ready status and read data.

14. The method of claim 13 further comprising accessing a common memory via a common memory interface.

15. The method of claim 13 wherein one of the first and second processors is a direct memory access (DMA) controller.

16. The method of claim 13 wherein one of the first and second processors is a microprocessor.

17. The method of claim 13 wherein the first slave device is one of a memory device and a peripheral device.

18. The method of claim 13 wherein the plurality of slave buses includes at least one of a homogenous set and a heterogeneous set.

19. A system comprising:
   first and second processors coupled to first and second master buses;
   a plurality of slave buses, each of the slave buses coupled to a plurality of slave devices; and
   a master bus interface circuit coupled to the first and second master buses and the plurality of slave buses, the master bus interface circuit comprising a plurality of bus controllers, each of the bus controllers comprising:
   a bus arbiter coupled to the first and second processors via the first and second master buses, respectively, to generate an arbitration select signal based on result of arbitrating bus access information from the first and second processors,
   a first multiplexer coupled to the first and second master buses and a first slave bus in the plurality of slave buses to provide device access information selected from the bus access information using the arbitration select signal, the device access information being transferred to a first stave device connected to the first slave bus,
   a second multiplexer coupled to the first slave bus to provide bus response information from device response information using the device select signal, and
   a de-multiplexer coupled to the second multiplexer and the first and second master buses to transfer the bus response information to one of the first and second processors using the arbitration select signal.

20. The system of claim 19 wherein the device access information includes at least one of slave address and write data.

21. The system of claim 20 wherein each or the bus controllers further comprising:
   an address decoder coupled to the bus arbiter and the first multiplexer to decode the slave address, the decoded slave address specifying the first slave device, the address decoder generating device select signal.

22. The system of claim 19 wherein the device response information includes at least one of device ready status and read data.

23. The system of claim 22 further comprising:
   a common memory coupled to the plurality of slave buses via a common memory interface to provide access to one of the first and second processors.

24. The system of claim 22 wherein one of the first and second processors is a direct memory access (DMA) controller.

25. The system of claim 22 wherein one of the first and second processors is a microprocessor.

26. The system of claim 22 wherein the first slave device is one of a memory device and a peripheral device.

27. The system of claim 22 wherein the plurality of slave buses includes at least one of a homogenous set and a heterogeneous set.

* * * * *